United States Patent [19]

Pelzer

[11] Patent Number: 5,198,626
[45] Date of Patent: Mar. 30, 1993

[54] HEAT PROTECTIVE, SOUND PERMEABLE LINING

[76] Inventor: Helmut Pelzer, Neue Strasse 5, D-5804 Herdecke-Ende, Fed. Rep. of Germany

[21] Appl. No.: 248,815
[22] Filed: Sep. 23, 1988

[30] Foreign Application Priority Data

Oct. 2, 1987 [DE] Fed. Rep. of Germany ....... 3733285

[51] Int. Cl.[5] ............................................... E04B 1/82
[52] U.S. Cl. ..................... 181/291; 181/294
[58] Field of Search ............... 181/291, 292, 290, 293, 181/294

[56] References Cited

U.S. PATENT DOCUMENTS

| | | | |
|---|---|---|---|
| 1,783,276 | 12/1930 | Bliss | 181/292 X |
| 1,972,563 | 9/1934 | Irvin | 181/292 |
| 2,954,838 | 10/1960 | Nuorivaara | 181/290 |
| 3,498,405 | 3/1970 | Charpentier | 181/291 |
| 3,501,878 | 3/1970 | Segal | 181/290 X |
| 3,814,208 | 6/1974 | Morresi et al. | 181/293 |
| 4,574,915 | 3/1986 | Gahlau et al. | 181/290 |
| 4,705,139 | 11/1987 | Gahlau et al. | 181/290 |

Primary Examiner—Benjamin R. Fuller
Assistant Examiner—Alrick Bobb
Attorney, Agent, or Firm—R. H. Siegemund

[57] ABSTRACT

An aluminum lining in combination with a sound absorbing object such as a fleece and for protection against thermal load, has a double corrugated contour resulting in pyramids and being perforated in specific locations such as the peaks, along the edges of both.

4 Claims, 1 Drawing Sheet

HEAT PROTECTIVE, SOUND PERMEABLE LINING

BACKGROUND OF THE INVENTION

The present invention relates to an aluminum lining and covering of automobile parts or the like, particularly insert pieces and other, internal structural elements including particularly but not exclusively components being made of a sound absorbing quality; the lining is to be provided as a protection against excessive heat loads such as hot machine parts, gas fumes, catalyst operation or the like.

It is known to protect machine parts generally against temperature loads by covering them with aluminum foils. This is disclosed in German petty patent 87 00 910. It was found however that such a lining offers the disadvantage that if the part being lined has sound absorbing properties, the aluminum cover or foil robs the part of that property because sound will be reflected and not absorbed by the aluminum foil.

U.S. Pat. No. 2,887,173 suggests a sound absorber of a particularly variety. Here then heat reflection through providing a heat barrier is not made possible because this particular sound absorber is made of aluminum (see e.g. Column 2, line 66, 67 and 68 of that reference). Rather it constitutes a particular heat bridge. The bore provided therein is not provided for sound emanation but establishes an acoustic resonator under utilization of the material involved.

German petty patent 19 83 950 suggests corrugation for sound absorber and here bores are matched to a convex or concave configuration. Unfortunately the reference also suggests the utilization of an artificial resin as a cover and that impedes with heat reflection.

Finally, U.S. Pat. No. 4,335,797 discloses a sound attenuating cover or lining for machine which admits access of external air for purposes of cooling. Therefore the particular structure is not suitable for establishing adequate heat reflection.

DESCRIPTION OF THE INVENTION

It is an object of the present invention to provide a new and improved lining of the type referred to in the introduction which retains the function as a reflector for heat radiation but is permeable for sound waves so that any sound absorbing quality of the object underneath the lining is not being interfered with but remains acoustically effective.

In accordance with the preferred embodiment of the present invention it is suggested to provide an aluminum foil as a corrugated sheathing or cover and which is perforated in plural, spaced apart locations. The perforations e.g. small openings or slits of the aluminum foil do not interfere with the effectiveness of the foil as a heat reflector but are very effective as a sound permeable devices for permitting the transmission of sound waves into the lined object so that the sound absorber provided underneath the foil remains fully effective in that capacity.

The corrugation of the foil increases the effective surface which in turn improves diffused reflection of heat radiation by the corrugated foil. Moreover, this corrugation makes sure that subsequent to the placement of the lining onto a part to be protected, the surface enlargement remains and is not interfered with. Moreover, it was found to be of advantage that optically a uniform appearance pattern obtains even after the aluminum foil with corrugation has been applied to the particular parts to be protected.

It is a further advantage that the corrugation of the Aluminum foil increases the mechanical strength of the foil so that in turn more openings can be provided, through the aforementioned perforation, without interfering with an adequate mechanical strength of the foil as a whole. That aspect is beneficial for providing an adequate number of passage ways for the sound to be absorbed underneath. It was found practical to perforate the foil at the same time the corrugation is established.

By way of example the corrugating tool may be configured with the cutting edgelike edges which in the area where the perforations are desired will traverse locally the foil. A simple piercing of uncorrugated. Aluminum foil is very expensive and the respective perforating tools wear heavily.

Another advantageous feature is to provide the perforations in apex regions of the corrugated pattern. Here it is deemed to be of specific advantage that the corrugations are formed through two orthogonally arranged corrugation patterns so that as a consequence there are pyramid shaped or truncated pyramid shaped projections and indentations matching (or vice versa). The edges may at least be partially perforated for purpose of providing the aforementioned perforations. The apex region of the pyramid may in the alternative be provided with the perforations or both. These perforations may cover the whole of a truncated peak, or just a portion thereof. There may be square shaped tubular extensions for protection of the openings.

In the case of an aliophobic or hydrophobic layer or stratum to be lined and where the aluminum faces away from the heat source it may be of advantage to provide this layer as a fleece. The sound absorber may be e.g. provided as a combination of a carrier fleece with corrugated Aluminum foil. The fleece may be the element to be lined, or may be part of a lining for something else, the lining in either case to include the aluminum foil.

Generally speaking it is also a feature of the invention to provide a specific device for the making of such lining. Here a plunger or punch is provided having conical or pyramid shaped projections whereby in certain areas edges are provided as cutting edges, and a counter punch is provided to be of a matching configuration.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Figure 1:
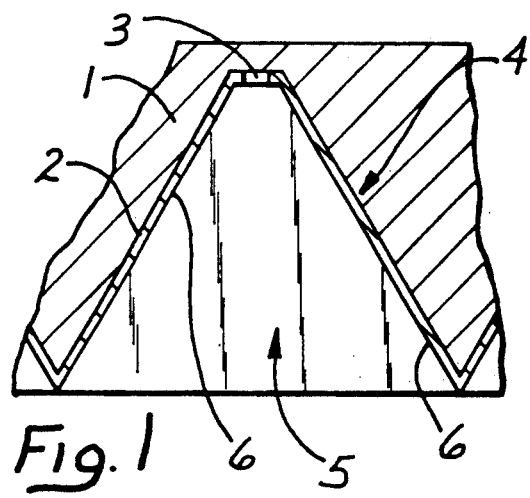
FIG. 1 is a sound absorbing element with aluminum foil shown as a structural unit; the aluminum foil lining being constructed in accordance with the preferred embodiment of the present invention for practicing the best mode thereof.

Proceeding now to the detailed description of the drawings it is assumed in FIG. 1 that a sound absorbing structure is provided in the form of a fibrous mat 1, pad or the like. Generally this mat is assumed to be constructed as fleece. That fleece 1 is covered by an Aluminum foil 2. The foil 2 is provided with a dual corrugation pattern. One can interpret specifically this pattern as being constructed by two orthogonally arranged triangularly profiled corrugation patterns resulting in upside down pyramids (5).

The inserted pyramids are provided with strategically placed perforations. From the point of view of making these perforations they are bets being regularly spaced, but that is not an inherent necessity. In this specific example, the perforations are established through openings 3 in the pyramid peaks.

The specific case and example of FIG. 1 has these openings provided in the bottom of the pyramidlike recesses in the fleece 1. The foil 2 itself is configured as a structure in which from both sides there appear projections the indents being of truncated pyramid shape; they are generally depicted as reference numerals 5. In this case of FIG. 1 they constitute indents in the fleece 1. Upon removing the fleece 1 and looking at the foil from the side where the fleece had been the so called indents appear as truncated pyramids. The spaces in between the pyramids are so to speak the negatives or the complements of them.

There are of course edge 6 being the edges of the pyramids and they may or may not be perforated by means of slits. The peak opening 3 may be the sole perforation or there may be slots in some of the edges or both. Reference numeral 7 refers to the truncated top (bottom) platform of a pyramid and may be perforated in its entirety or that some of it may be configured as an opening. The manufacture of such lining is carried out either through cutting or perforating or both as the pyramid contour is imparted upon what was originally a planar foil and will be described below.

Figure 3:
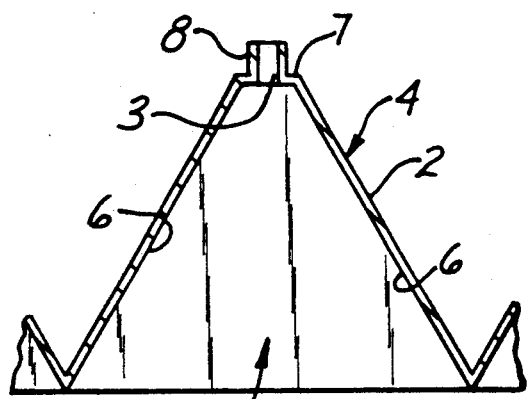
FIG. 3 is a section taken through III—III in FIG. 2.
Figure 2:
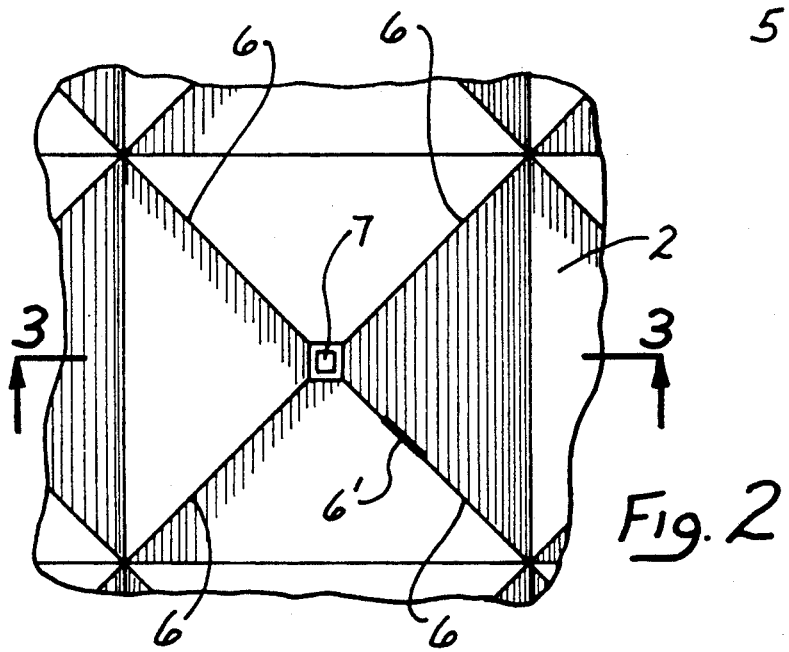
FIG. 2 is a top view of an aluminum foil after it has been made.

As shown specifically in FIGS. 2 and 3 certain extension 8 are provided which are of square shaped cross section and they extend in an orthogonal direction to the openings 3 (or top 7) as far as their respective plane of extension is concerned. These elements 8 may be provided separately whereby this particular fleece material before being lined is provided with these small insets 8 and they are then pressed into the truncated top of the pyramids as the foil is force into the material so lined. The particular elements 8 may be upset in longitudinal direction so that in fact the perforation 3 will not be closed as the foil is forced into the base material to be lined such as the fleece 1. The ductlike elements 8 therefore protect the openings 3 from being closed as a result of force interaction between the lining and the object being lined.

Figure 4:
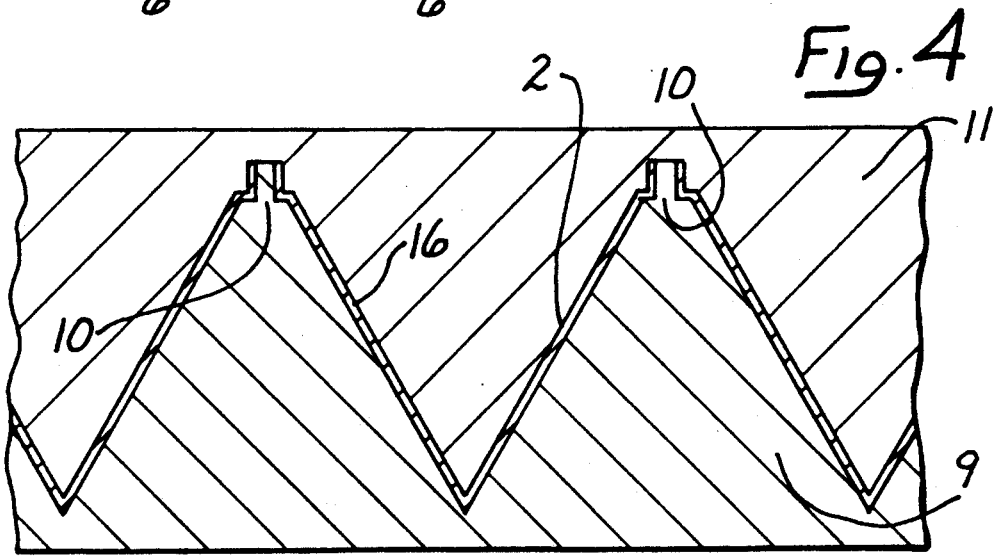
FIG. 4 shows tooling for making an inventive lining.

FIG. 4 illustrates in detail the tooling by means of which the foils are made and contoured in the first place. The tool includes a first tool element having a plurality of truncated pyramidlike projections 9 and mating and matching counterparts 11 in the other tool element. Projections and counterparts 9 and 11 can also be construed to be a particularly combination of punch and counterpunch. The tool may be provided in addition with perforating projections 10 which will cause peak portion of the foil as they are formed into pyramids to fold up and become perforations with duct ends of square shaped cross section. In addition or alternatively the edges 16 of pyramidlike projections 9 may in part be constructed as cutting edges to provide slots such as 6' into portions of the pyramid edges of the foil.

The foil was originally placed onto/into the tool wherein the perforating projections 10 act as a plurality of plungers. As the cutting obtains the lining becomes oriented transversely to the plane of the respective opening. The result then in a foil contour shown in FIG. 2 and 3.

One can also see that punch 9 may be used to force the foil into the fleece (FIG. 1). Here the projections 10 provide an addition protection against closure of the openings by holding ductlike elements 8 inside a non-hollow configuration of foil material and to therewith expose the interior of the truncated pyramids through ductlike elements 8 directly to the fleece. That way sound conduction into the absorbing fleece is ensured.

The invention is not limited to the embodiments described above but all changes and modifications thereof, not constituting departures from the spirit and scope of the invention, are intended to be included.

I claim:

1. A lining for component portions of an automobile for protecting said component portions against heat including a sound absorbing fleece part in attachment combination therewith, the lining being comprised of heat reflecting aluminum foil having a corrugated contour and being perforated in peak locations of the corrugation, the peak locations being covered by the fleece.

2. Lining as in claim 1, the corrugated contour being established by two orthogonally effective corrugated patterns resulting in a plurality of pyramid or truncated pyramid shaped projections.

3. Lining as in claim 2, wherein the perforations are provided in respective apex regions of the truncated pyramid shaped projections.

4. Lining as in claim 2, wherein additional perforations result along edges of the truncated pyramid shaped projections.

* * * * *